June 10, 1930.                R. J. BRITTAIN, JR., ET AL              1,762,810
                                HEADSTOCK AND GAUGE SUPPORT
                              Filed May 26, 1924           2 Sheets-Sheet 1

INVENTORS:
William H. Chapman,
Richard J. Brittain Jr.,
by
Their Attorney

Patented June 10, 1930

1,762,810

UNITED STATES PATENT OFFICE

RICHARD J. BRITTAIN, JR., OF NEWARK, AND WILLIAM H. CHAPMAN, OF MONTCLAIR, NEW JERSEY, ASSIGNORS TO GENERAL MOTORS CORPORATION, OF DETROIT, MICHIGAN, A CORPORATION OF DELAWARE

HEADSTOCK AND GAUGE SUPPORT

Application filed May 26, 1924. Serial No. 715,906.

This invention relates to cutting and grinding machines and is herein shown as embodied in a combined head stock and gauge support for internal grinding machines.

When grinding the interior of a hollow sleeve, it is common practice to have a gauge point ride on the inner surface of the work to indicate how fast the operation is proceeding. Such gauges, however, have heretofore been supported entirely independently of the head stock or work holder and any deflection of the head stock and the work introduces an error into the gauge reading. This deflection may and does arise due to the pressure of the grinding wheel against the work with a consequent movement of the work relatively to the gauge. The usual plain bearings which rotatably support a work spindle require space for an oil film which also allows the axis of the work spindle to vary and to be deflected relatively to its mounting.

It is an object of this invention, therefore, to provide a head stock and gauge support such that the above and other disadvantages may be overcome. As shown, the gauge and the work spindle have a common support which eliminates one cause of relative deflection. Each is movably mounted in that support, the work spindle to rotate and the gauge to slide and swing, but lost motion is avoided by ball bearing mountings which insure movement on parallel axes. The work spindle is rotatably mounted on ball bearings in the support to run true on a line axis and the gauge is mounted on ball bearings to slide and swing on an axis which always remains precisely parallel to the work spindle axis. This eliminates the "oil film" deflection. To insure still more accurate gauging, the gauge point is mounted to engage the work at a point 90° removed from the point of engagement of the tool. Hence deflection due to pressure of the tool can have no appreciable effect on the gauge.

Referring to the drawings, Figure 1 is a vertical section with some parts broken away.

Figure 1:
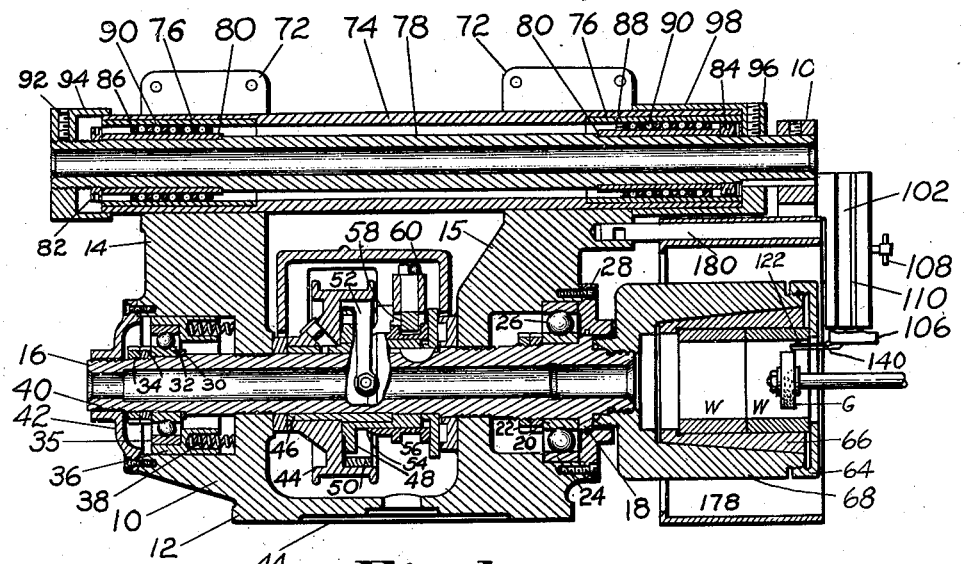

The numeral 10 indicates a support or head which, in the present instance is stationary, but, when curved work is being ground, is adapted to oscillate on a central, vertical axis. It comprises a circular base 12 with upwardly extending arms 14 and 15 in which is journalled for rotation, on an unvarying axis, a hollow, horizontal shaft or work spindle 16. The shaft 16 is constrained to rotate on a line axis by being mounted on ball bearings having no play. Near one end of the shaft is a flange 18 against which an inner race ring 20 is clamped by nuts 22. The corresponding outer race ring 24 for balls 26 is clamped in a recess of the arm 15 by means of an annular plate 28 fastened by screws to the arm 15 and grooved to receive a felt washer making a close joint with the flange 18. Near the other end, the shaft 16 is reduced, forming a shoulder abutting against a thrust washer 30, against which an inner race ring 32 is clamped by nuts 34. The corresponding outer race ring 35 is carried by a flanged ring 36 which is fitted to slide in a cylindrical recess of the arm 14. All play is prevented and wear automatically taken up in the bearings by constantly pressing the ring 36 in one direction by means of coil springs 38 fitting in holes in the ring 36 and bearing against the interior of arm 14. In order that dust may be excluded and lubricant retained, the shaft 16 has right and left threads 40 at one end fitting a smooth bore in a cap 42. Right and left threads are also formed on the shaft to fit loosely in the bores of arms 14 and 15.

The shaft 16 may be driven in any suitable way. As shown, a pulley 44 is loosely mounted on a sleeve 46 surrounding the shaft but can be clutched to a flanged sleeve 48 keyed to the shaft. A split band 50, inside the pulley, is expanded against it by a lever 52 pivoted on the flange of sleeve 48. The inner end of each lever is pressed radially outward by a conical face 54 on a grooved collar 56 which is slid along the sleeve 48 by a pin 58 depending from an actuating arm 60 pivoted at 62 on the support. The work pieces W, here shown as hollow sleeves or bands, to be internally ground, are rotated by the shaft 16, being clamped in axial alignment therewith by any suitable form of chuck or work holder. As illustrated, the work pieces W are clamped by a flanged nut 64 against a shoulder of a conical bushing 66 in a corresponding conical chuck casting 68 screwed on the end of the hollow shaft 16. The end of casting 68 may have threads on the outside fitting a smooth bore in plate 28 to throw out dirt.

The gauge and the work holder have a common support in order to reduce the likelihood of relative deflection. The arms 14 and 15 are extended upwardly and split as at 72 to receive a sleeve 74 which rigidly spaces the arms when clamped in adjusted position by clamping screws (not shown). The split portions of the arms can be separated by screws 73 to release the sleeve. The sleeve 74 carries liners 76 in recesses at the ends, and a hollow shaft 78 extends through the sleeve from end to end. The shaft is shouldered and liners 80 are clamped against the shoulders by nuts 82 and 84 threaded on the shaft. Between the liners, are inserted bearings of translation and rotation comprising sleeves or rings 86 and 88, each having longitudinal and peripheral series of openings for balls 90 which are held against escape by peening down the metal at the rims of the openings. One end of the sleeve 74 is closed by a cap 92 fixed to the shaft and having a cylindrical flange 94 surrounding the end of the sleeve. The other end of the sleeve is closed by a cap 96 fixed to the shaft and having a cylindrical flange 98 surrounding the sleeve. The shaft can slide and swing on the ball bearings, on an axis which is precisely parallel to the axis of the work holder. To the end of the shaft is fixed an arm 100 having a depending slide holder 102 having a slideway which is parallel to a line connecting the axes of the shaft and of the work holder. The slideway receives a dovetail 104 on a slide, herein shown as a gauge housing 106 which can be clamped in adjusted position by a hand screw 108 bearing against a gib 110 in the groove of the slide holder.

Figure 3:
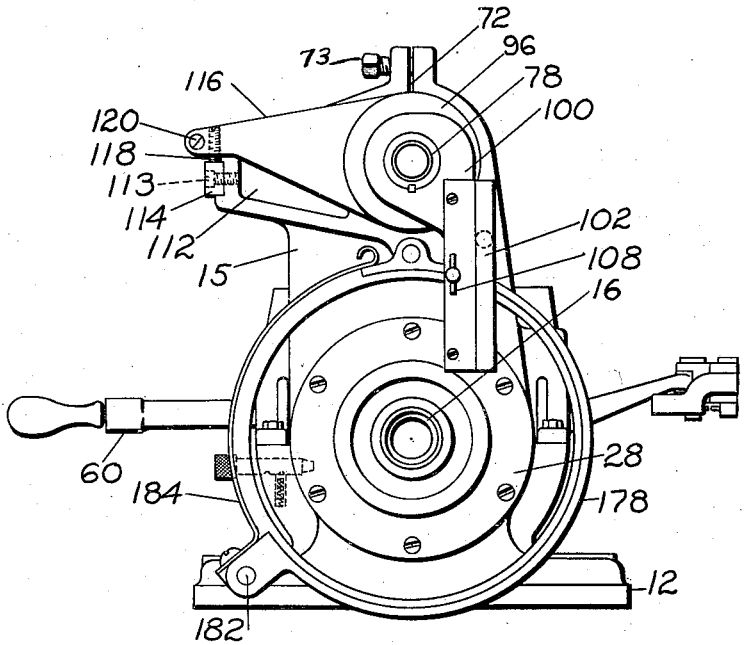
Figure 3 is an end elevation with the gauge, work holder and operating tool omitted.

In order that the shaft and the gauge may occupy a predetermined normal operative position, the support or head 10 is provided with a forwardly extending bracket 112 (see Figure 3) having a recess in which is fastened by screws 113 a fixed horizontal bar 114 which supports an arm 116 integral with the cap 96. The end of the arm 116 is split to receive an abutment screw 118 which is clamped in a set position by a screw 120. The weight of the gauge and the arm tends to swing the parts to the operative position shown, wherein a gauge point 122 rides against the work piece at a point 90° removed from the point of engagement of the tool, herein shown as a grinding wheel G. The tool engages the rear, inner surface of the work and the gauge point engages the upper, inner surface. Hence any slight displacement of the chuck, due to pressure of the tool, will not cause any appreciable movement of the gauge point. Deflection of the work rotating shaft has heretofore been considerable, due to the necessity for an oil film space in the usual plain bearings but this ball bearing mounting eliminates it.

Figure 2:
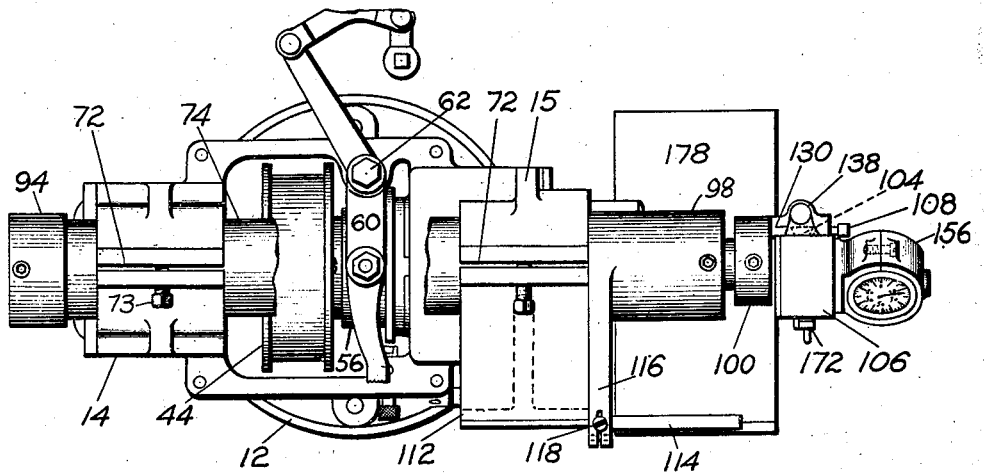
Figure 2 is a plan view with some parts broken away.
Figure 4:
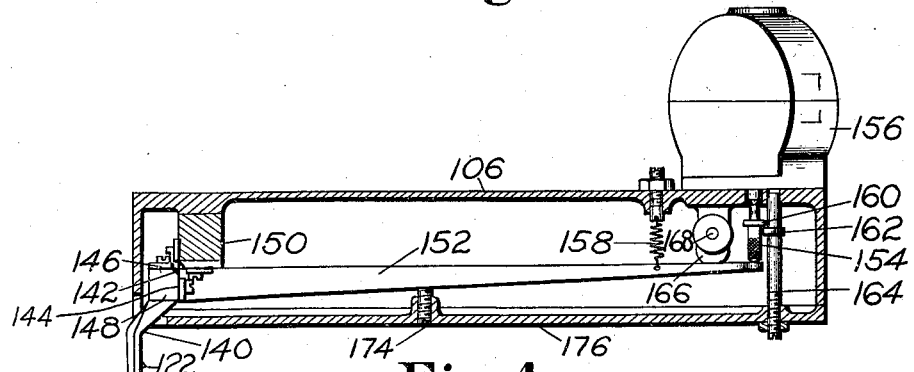
Figure 4 is a longitudinal section of the gauge looking from the rear.
Figure 5:
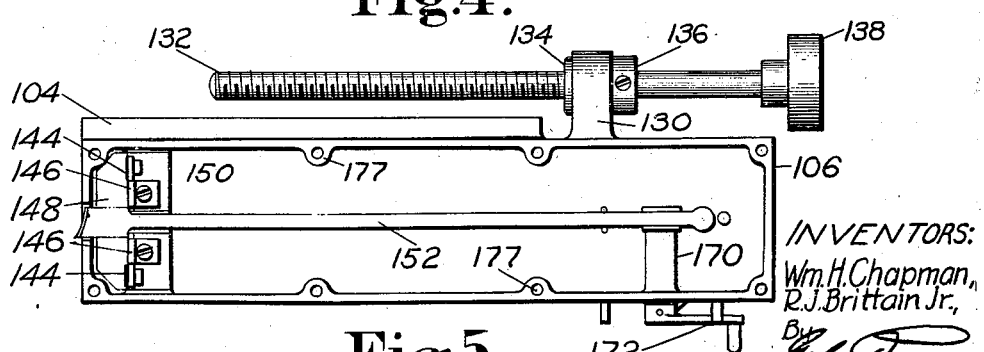
Figure 5 is a side view of the gauge with the cover plate removed.

The gauge shown in Figures 2, 4 and 5 comprises a housing 106 from the back of which extends a lug 130 rotatably supporting an adjusting screw 132. The screw is held against longitudinal movement in the lug by collars 134 and 136 and is threaded in a tapped opening in the slide holder 102 so that turning of the screw by a hand wheel 138 will raise or lower the gauge. The gauge point 122 is formed on the upper face of a gauge arm 140 which extends horizontally into the interior of the work. The gauge arm 140 projects through a corner of the gauge housing and is formed as part of a lever which is pivoted at the point 142 by means of two sets of crossed springs 144 and 146. The springs are attached by cleats screwed to a cross bar 148 on the arm 140 and to a block 150 in the housing. The arm and the block are bevelled where the springs cross to give freedom of movement to the springs. The long arm 152 of the lever bears at its end against a gauge stem 154 projecting from an indicator housing 156 and is held against the stem by a spring 158. Outward movement of the gauge stem 154 is limited by a collar 160 overlying a collar 162 on an axially slidable screw 164 adjustably fastened to the housing. To swing the arm 152, as when moving the gauge point 122 away from the work, an eccentric cam 166 is turned against the arm. The cam is fixed to a shaft 168, journalled in a boss 170, and turned by a crank handle 172. A stop pin 174, on a cover plate 176 fastened by screws to lugs 177 on the gauge housing, limits the movement of the lever under the influence of the cam. A water guard 178 fastened by a pin 180 to the arm 15 and by a pin 182 to the base 12 encloses the work and has a removable section 184 to allow access to the chuck and work. Adjustment of the gauge housing on the slideway, and when grinding, the swinging of the gauge arm 140 under the influence of the spring 158 causes a movement of the gauge point along a line connecting the axis of the work holder and the axis of the hollow shaft 78.

In operation, with the gauge in a swung-up position, the work is clamped in the chuck or work holder and the shaft 78 is slid to the right as viewed in Figure 1 and swung downwardly by means of the arm 116. Then the shaft is slid to the left to bring the gauge point inside the work. The gauge housing may then be adjusted upwardly on its slideway by the screw 132 until the gauge point nearly contacts with the work. The cam 166 is then turned to release the gauge lever 152 and allow the indicator to continuously indicate the progress of the grinding operation as the gauge point swings upwardly under the influence of the spring 158. To remove the gauge, the shaft 78 is slid to the right, swung upwardly and then slid to the left to bring the arm 116 over the supporting bar 114. The up and down adjustment of the gauge housing adapts the gauge for cooperation with work pieces of different diameters. When the work pieces are short, a shorter chuck can be employed and in that case, the supporting shaft 78 of the gauge housing and its surrounding sleeve 74 are adjusted to the left. This is accomplished by loosening the clamping bolts, manipulating the bolts 73 and reclamping the sleeve in its new position. Hence, the overhang of the work and the gauge beyond the support is reduced to a minimum for each particular job and this still further insures accurate gauging. If necessary, the water guard can be moved inwardly and the cap 96 can be moved outwardly or these two members can be replaced by narrower ones of the same kind.

Although the invention has been described by referring to a specific machine, it should be understood that, in its broad aspects, it is not necessarily limited thereto.

We claim:

1. In an internal cutting machine, a work holder, a head, bearings in the head for rotatably supporting the work holder, the head having integral extensions beyond the work holder, a shaft extending through the extensions, bearings of translation and rotation for slidably and rockably supporting the shaft in the extensions of an axis parallel to the axis of the work holder, an arm fixed to the end of the shaft, and a gauge carried by the arm for sliding and rocking movement with the shaft to carry its work engaging member into or out of the bore of the work; substantially as described.

2. In apparatus of the character described, a work holder, a head having a pair of spaced arms, means for rotatably supporting the work holder in the arms, a sleeve connecting and bracing the arms and arranged parallel to the axis of the work holder, a shaft extending through the sleeve, a gauge carried by the shaft, and means for supporting the shaft for sliding and swinging movement in the sleeve to carry the gauge into and out of operative relation to the work; substantially as described.

3. In apparatus of the character described, a work holder, means for rotating the work holder, a support for the work holder, a shaft mounted in the work holder support to slide and swing on an axis parallel to the axis of the work holder, a gauge carried by the shaft, an arm for swinging the gauge, and a bar secured to the work holder support for supporting the arm; substantially as described.

4. In an internal cutting machine, a work holder, a head, bearings in the head for rotatably supporting the work holder, the head being extended above the work holder, a shaft extending through the extended portion of the head, bearings of translation and rotation for slidably and rockably supporting the shaft in the extended portion of the head, an arm depending from the end of the shaft, a gauge carried by the arm and having a work engaging element to enter the bore of the work, and a second arm connected to the shaft and projecting therefrom for sliding and swinging the shaft; substantially as described.

5. In an internal cutting machine, a work holder, a head, means for rotatably supporting the work holder on the head, the head being extended above the work holder, a shaft, means for supporting the shaft in the extended portion of the head to slide and swing on an axis parallel to the axis of the work holder, an arm depending from the shaft, a gauge mounted on the arm and having a laterally projecting work engaging member to enter the bore of a hollow work-piece, and means for moving the gauge along the arm towards or from the shaft to position the work engaging member for work-pieces of different sizes; substantially as described.

6. In apparatus of the character described, a work holder, means for rotating the work holder, a support, a shaft mounted in the support to slide and swing on an axis parallel to the axis of the work holder, an arm depending from the end of the shaft and having a slideway, a gauge and a gauge housing movable along the slideway; substantially as described 7. In apparatus of the character described, a rotary work holder for a hollow work piece, a head forming a support for the work holder, a gauge, means on the head for supporting the gauge to slide and rock on an axis parallel to the axis of the work holder, said gauge having a work engaging member riding on the interior of the work-piece and movable radially towards the axis of rocking; substantially as described.

8. In apparatus of the character described, a work holder, means for rotating the work holder, a support for the work holder, a sleeve fixed to the work holder support, a shaft extending through the sleeve and arranged for sliding and rocking movement therein on an axis parallel to and above the axis of the work holder, and a gauge carried by the shaft to slide and swing therewith and also having a laterally projected work engaging point movable along a line connecting the axis of rocking with the axis of the work holder; substantially as described.

9. In apparatus of the character described, a support having spaced arms, a rotary work holder journalled in the arms, a sleeve joining and rigidly spacing the ends of the arms, a shaft mounted in the sleeve to slide and swing on an axis parallel to the axis of the work holder, and a gauge carried by the shaft; substantially as described.

10. In apparatus of the character described, a support, a sleeve fixed to the support, a shaft extending through the sleeve, liners at the ends of the sleeve, liners near the ends of the shaft, multiple sets of ball bearings interposed between the liners to give a long bearing for the shaft, means for sliding and rocking the shaft, and a gauge carried by one end of the shaft; substantially as described.

11. In apparatus of the character described, a support, a work holder journalled for rotation in the support, a sleeve carried by the support, a shaft movably mounted in the sleeve, a gauge carried by the end of the shaft, and means for varying the longitudinal position of the sleeve in the support to locate the gauge for work pieces of different sizes; substantially as described.

12. In an internal cutting machine, a work holder, a head, means for rotatably supporting the work holder on the head, the head being extended above the work holder, a shaft, means for supporting the shaft in the extended portion of the head to slide and swing on an axis parallel to the axis of the work holder, an arm depending from the shaft and having a slideway, a gauge housing slidably mounted on the slideway, a work engaging member projecting from the housing to enter the bore of a hollow work-piece on the work holder, means for moving the gauge housing along its slideway, and means for causing the work engaging member to move on a line radial to the axis of the rocking shaft; substantially as described.

In testimony whereof we hereunto affix our signatures.

RICHARD J. BRITTAIN, Jr.
WM. H. CHAPMAN.